(12) United States Patent
Bormioli (10) Patent No.: US 9,341,269 B2
(45) Date of Patent: May 17, 2016

(54) CONTROL VALVE WITH PAIRS OF PETALS WITH DIFFERENT SHAPE AND SIZES AND WITH DIFFERENT CLOSING SPEED FOR SEPARABLE CONNECTION UNITS FOR FLEXIBLE HOSES

(71) Applicant: MIB Italiana S.P.A., Casalserugo PD (IT)

(72) Inventor: Lorenzo Bormioli, Padua (IT)

(73) Assignee: MIB ITALIANA S.P.A., Casalserugo PD (IT)

( * ) Notice: Subject to any disclaimer, the term of this patent is extended or adjusted under 35 U.S.C. 154(b) by 34 days.

(21) Appl. No.: 14/396,251

(22) PCT Filed: Apr. 24, 2013

(86) PCT No.: PCT/IB2013/053225
§ 371 (c)(1),
(2) Date: Oct. 22, 2014

(87) PCT Pub. No.: WO2013/160838
PCT Pub. Date: Oct. 31, 2013

(65) Prior Publication Data
US 2015/0083951 A1    Mar. 26, 2015

(30) Foreign Application Priority Data

Apr. 26, 2012   (IT) .............................. M12012A0693

(51) Int. Cl.
*F16K 1/16*   (2006.01)
*F16L 55/10*   (2006.01)

(52) U.S. Cl.
CPC . *F16K 1/16* (2013.01); *F16K 1/165* (2013.01); *F16L 55/1007* (2013.01); *F16L 55/1018* (2013.01); *Y10T 137/1624* (2015.04)

(58) Field of Classification Search
CPC ............. F16K 1/16; F16K 1/165; F16K 3/03; E21B 33/06; E21B 33/061; E21B 33/064; Y10T 137/1624; F16L 55/1018; F16L 55/1007
USPC ........................ 251/1.1, 149–149.2, 151, 212
See application file for complete search history.

(56) References Cited

U.S. PATENT DOCUMENTS

| | | | |
|---|---|---|---|
| 3,887,158 A * | 6/1975 | Polk | 251/1.1 |
| 4,326,555 A | 4/1982 | Thomson | |
| 6,375,155 B1 * | 4/2002 | Janssens | 251/212 |
| 8,998,171 B2 * | 4/2015 | Bormioli | 251/149.2 |

FOREIGN PATENT DOCUMENTS

| | | |
|---|---|---|
| IT | 20092146 A1 | 6/2011 |
| IT | 20102248 A1 | 6/2012 |
| WO | 2012/076240 A1 | 6/2012 |
| WO | 2012/076242 A1 | 6/2012 |

* cited by examiner

*Primary Examiner* — Matthew W Jellett
(74) *Attorney, Agent, or Firm* — Jacobson Holman, PLLC.

(57) ABSTRACT

A control valve for connection units for flexible hoses comprises a plurality of petals rotatable between a position of complete opening and a position of complete closing. The petals consist of pairs of petals with different shape and sizes, alternately arranged along the circumference of the connection unit. The petals of smaller size are controlled to close more slowly than those of larger size. The upstream surface of the petals of smaller size is provided with a pair of fins laterally protruding from the upstream surface so as to rest on the upstream surface of the petals of larger size to oblige the latter to close before the petals of smaller size.

2 Claims, 11 Drawing Sheets

CONTROL VALVE WITH PAIRS OF PETALS WITH DIFFERENT SHAPE AND SIZES AND WITH DIFFERENT CLOSING SPEED FOR SEPARABLE CONNECTION UNITS FOR FLEXIBLE HOSES

The present invention relates to a control valve of the type consisting of pairs of petals of different shape and sizes and with different closing speeds for separable connection units for hoses for transferring fluid products, in particular petroleum products.

It is known that sea transfer of petroleum products from petrochemical installation, from platform, from tanker to tanker, from tanker to land installation and vice versa is carried out through flexible hoses and hose connection units which consist of two separable parts, each provided with a respective control valve which automatically closes upon separation to limit the spillage of product into the sea, with consequent less pollution of the latter. These connection units are placed on the part of the flexible hose positioned in the sea and have the primary objective of protecting the hose, and more in general the connection line, in case of abnormal situations which cause excessive pulling on the hose or excessive pressure on the line. Such abnormal situations may be: breaking away and drifting off of tankers or more in general petroleum installations (FPSO) thus stretching the flexible hose, rough sea causing traction on the hose beyond the limits, boat knocking into the hose and dragging it away thus creating excessive loads thereon, quick closing of the valve downstream of the flow or any other reason causing excessive axial load and/or pressure increase.

The currently available connection units are made so that the control valves are automatically closed after the separation of the two parts of the connection unit, i.e. without control by an operator in the aforesaid situations.

Fluid control valves of the petal type are also known, i.e. consisting of a plurality of rotatable segments or sectors, which are rotated between an opening position, in which the petals are substantially parallel to the flow direction of the petroleum product, and a closing position in which the petals converge transversally to the axis of the unit to nearly completely block the product flow. The movement from the opening position to the closing position occurs under the bias of elastic means when the retaining action exerted, for example, by an axially removable inner sleeve, ceases due to the axial traction stress imposed on the connection unit. Fluid dynamic brakes appropriately slow down the closing speed of the upstream valve to avoid excessive pressure, called water hammer, determined by the combined action of the elastic means and of the pressurized fluid, which may have destructive effects on the control valve and on the connection unit itself.

A particular petal control valve is described in Italian patent application MI2010A002248, filed on 6 Dec. 2010, and comprises rotatable petals (or segments or sectors) of different shape and sizes which alternate in pairs along the circumference of the connection unit, and if used for the upstream control valve in the fluid flow direction, are controlled so that the smaller sectors close more slowly than the larger ones.

Thereby, the water hammer and the corresponding harmful effects for installation can be avoided during the closing process by appropriately choosing the shape and sizes of the petals and by appropriately adjusting the fluid dynamic brakes.

Despite the utmost care devoted during the designing process, one or more of the smaller sized petals may close more rapidly than the larger sized petals of the same valve due to various reasons related to the flow of the petroleum product or due to incorrect maintenance or other cause. If this occurs, a faulty approaching of the adjacent petals occurs, which does not ensure the required tight closing of the control valve.

It is the object of the present invention to avoid such a drawback by preventing the smaller sized petals from reaching the closing position before the larger sized petals, thus ensuring that the approaching of the petals is always correct as conceived during the designing process.

In accordance with the invention, such an object is achieved by providing the upstream surface (with respect to the product flow) of the petals of smaller size with a pair of fins laterally protruding from the above-mentioned surface so as to rest on the upstream surface of the petals of larger size to oblige the latter to close before the petals of smaller size, and by also providing the upstream surface of the petals of larger size with a pair of projections which at the end of the closing movement of the petals are inserted in corresponding recesses of the facing surface of the fins for making a precise and stable coupling of the adjacent petals in a tightly closed position.

Figure 1:
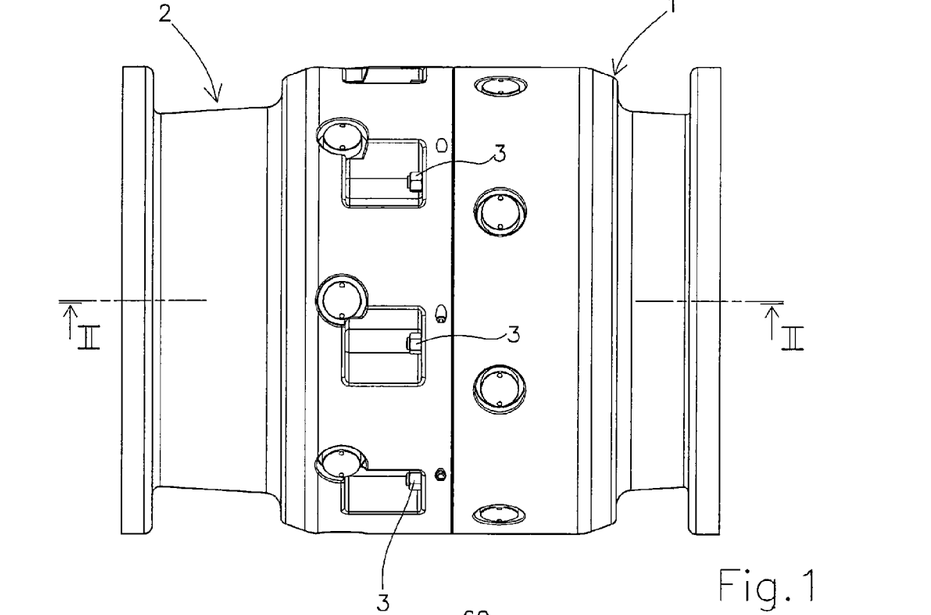
FIGS. 1 and 2 respectively show a side view and an axial section view, taken along line II-II in FIG. 1, of the connection unit for flexible hoses with petal control valves according to the present invention.

The features of the present invention will become further apparent from the following detailed description of an embodiment thereof, shown by way of non-limitative example in the accompanying drawings, in which:

FIG. 1 shows a connection unit for flexible hoses, which comprises two separable valve parts or bodies 1 and 2, upstream and downstream in the flow direction of the transported fluid product (from right to left in FIG. 2), respectively.

The two parts 1 and 2 are connected by burst screws 3, which break in case of strong traction stress (equal to or higher than the setting load), thus allowing to separate the two parts.

A cylindrical sliding sleeve 4 (FIG. 2) is arranged within the connection unit, which sleeve is automatically and axially removable from the connection unit when the two parts of the unit are separated.

The cylindrical sleeve 4 keeps the normally open position of two rotatable sector valves 5-5' placed upstream and downstream in the flow direction of the petroleum product, respectively.

The functions and operative modes of the sleeve 4 are described, for example, in Italian patent application MI2009A002146 filed on 4 Dec. 2009 by the Applicant.

Figure 2:
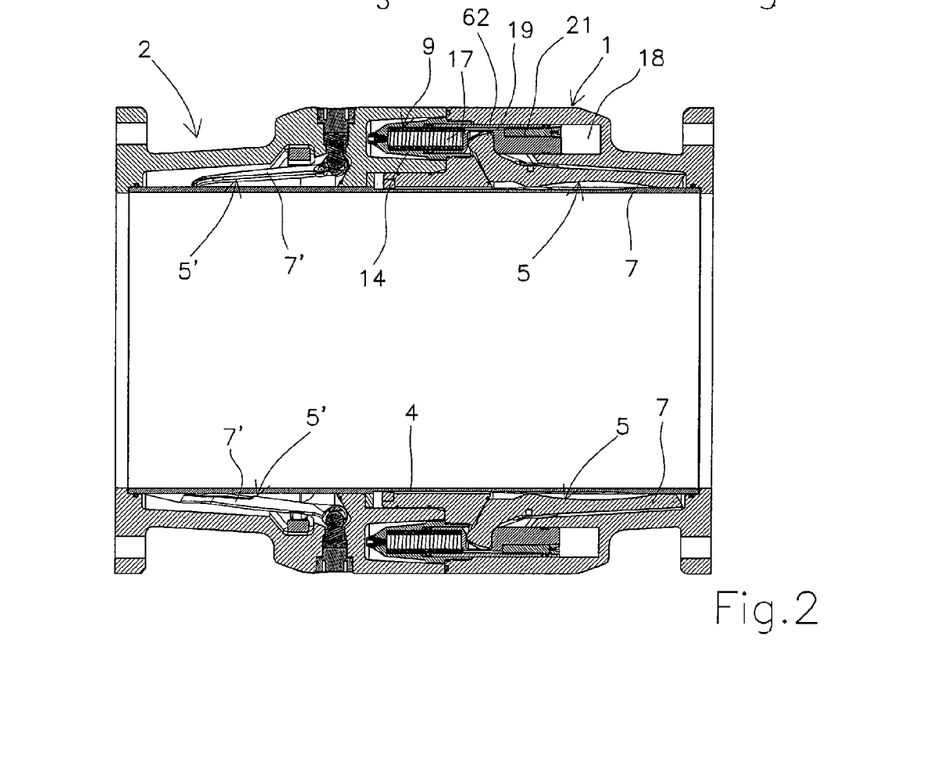
Figure 3:
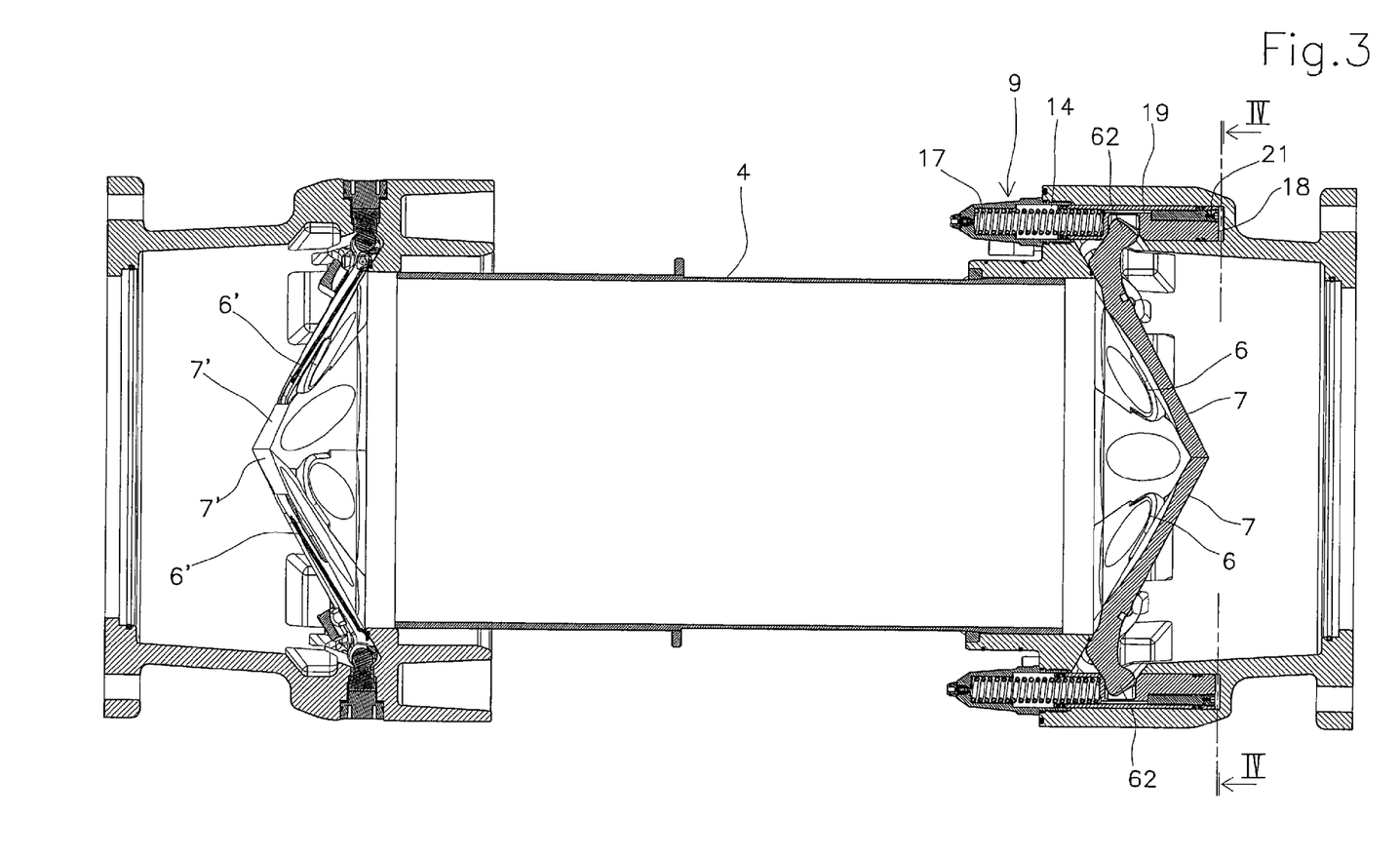
FIG. 3 shows an axial section view of the same connection unit during a two-parts separating process with the control valves already closed.
Figure 4:
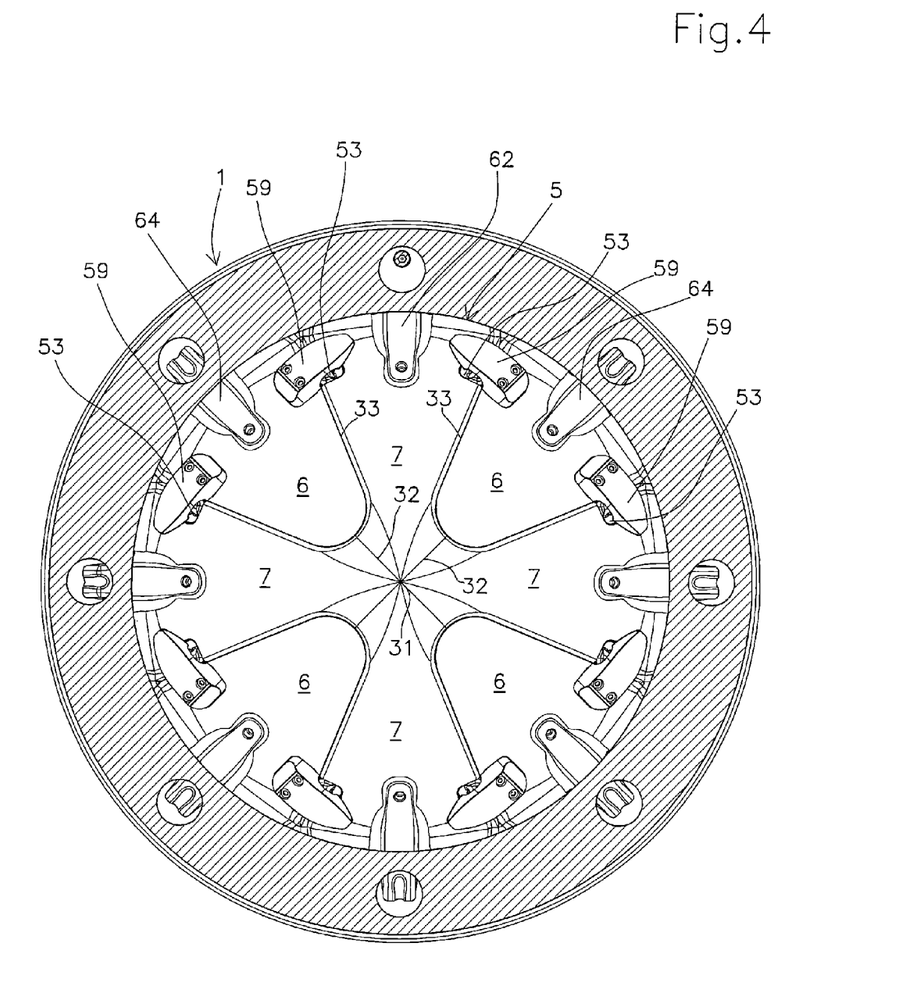
FIG. 4 shows a section view of the connection unit taken along line IV-IV in FIG. 3.
Figure 5:
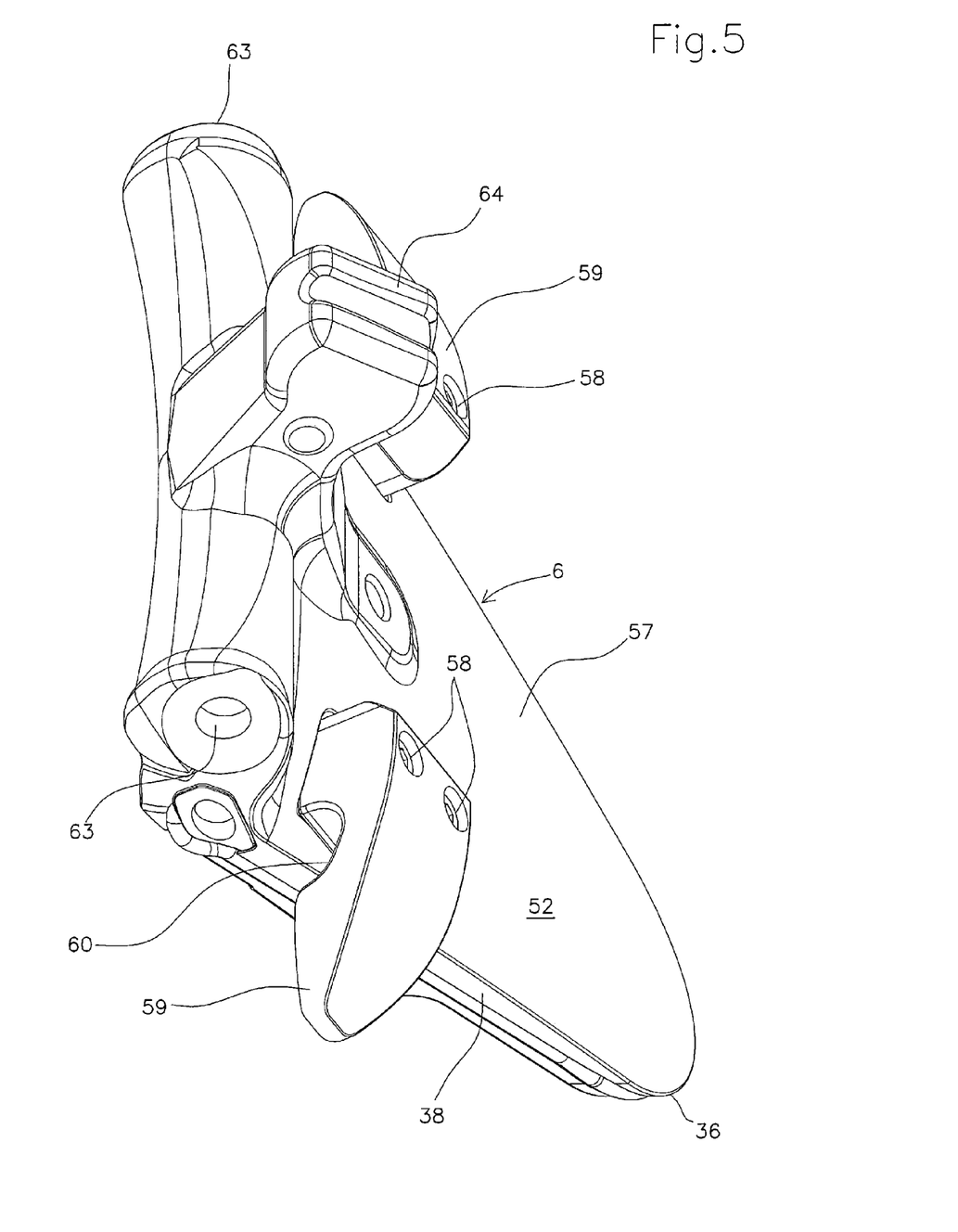
FIG. 5 shows a perspective view of one of the petals of smaller size of the control valve which is upstream in the flow direction of the petroleum product.
Figure 6:
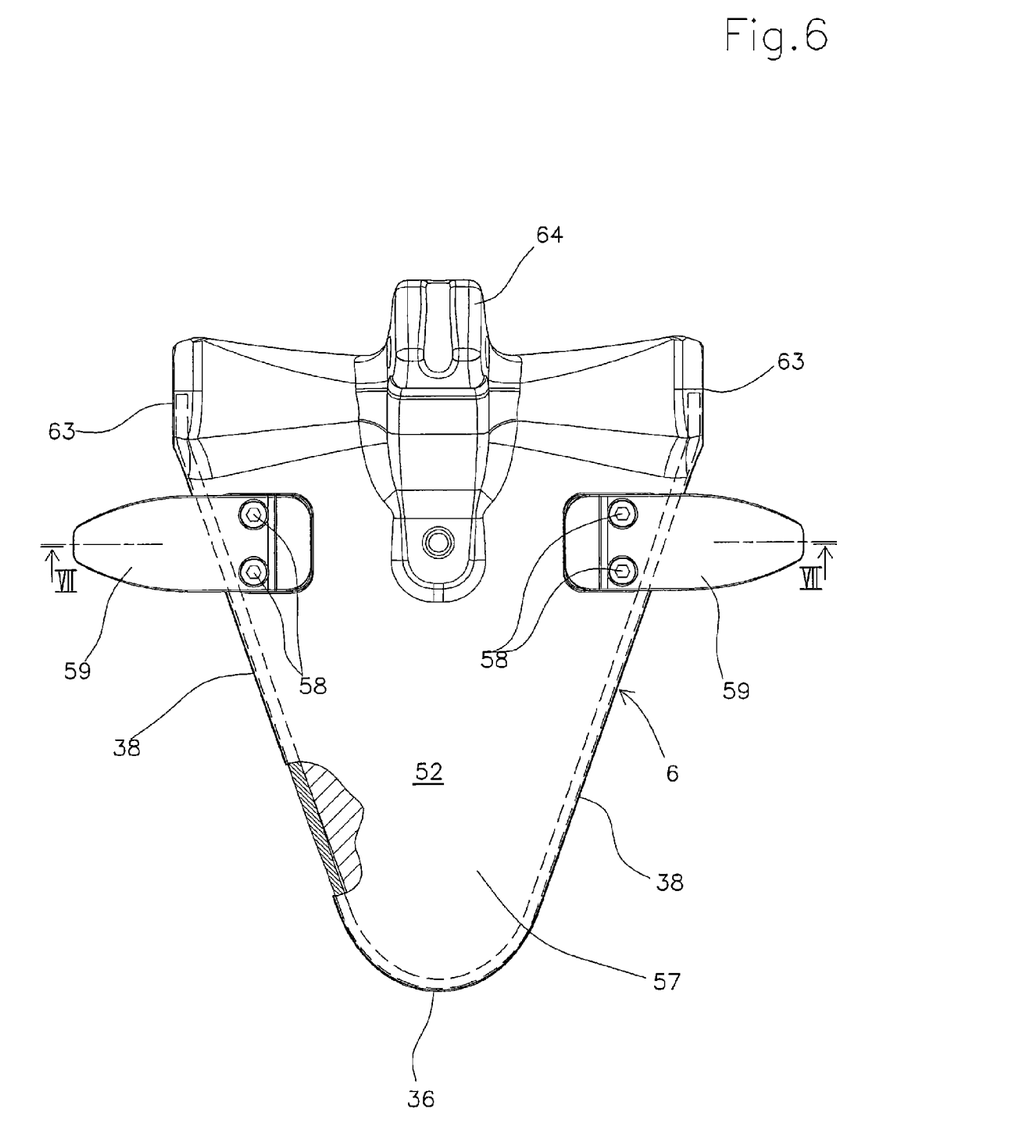
FIG. 6 shows a plan view of the same petal.
Figure 7:
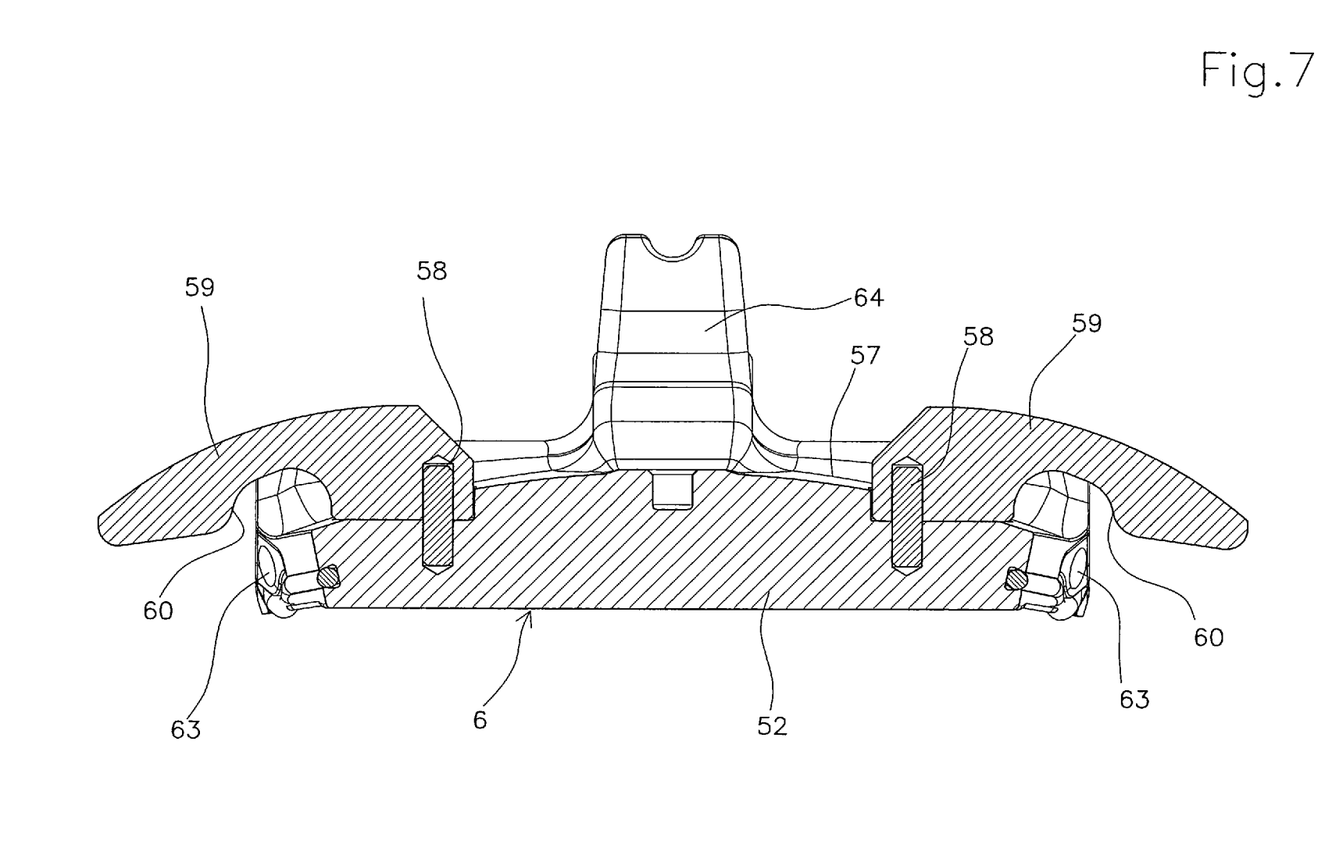
FIG. 7 shows a section view of the same petal taken along line VII-VII in FIG. 6.
Figure 8:
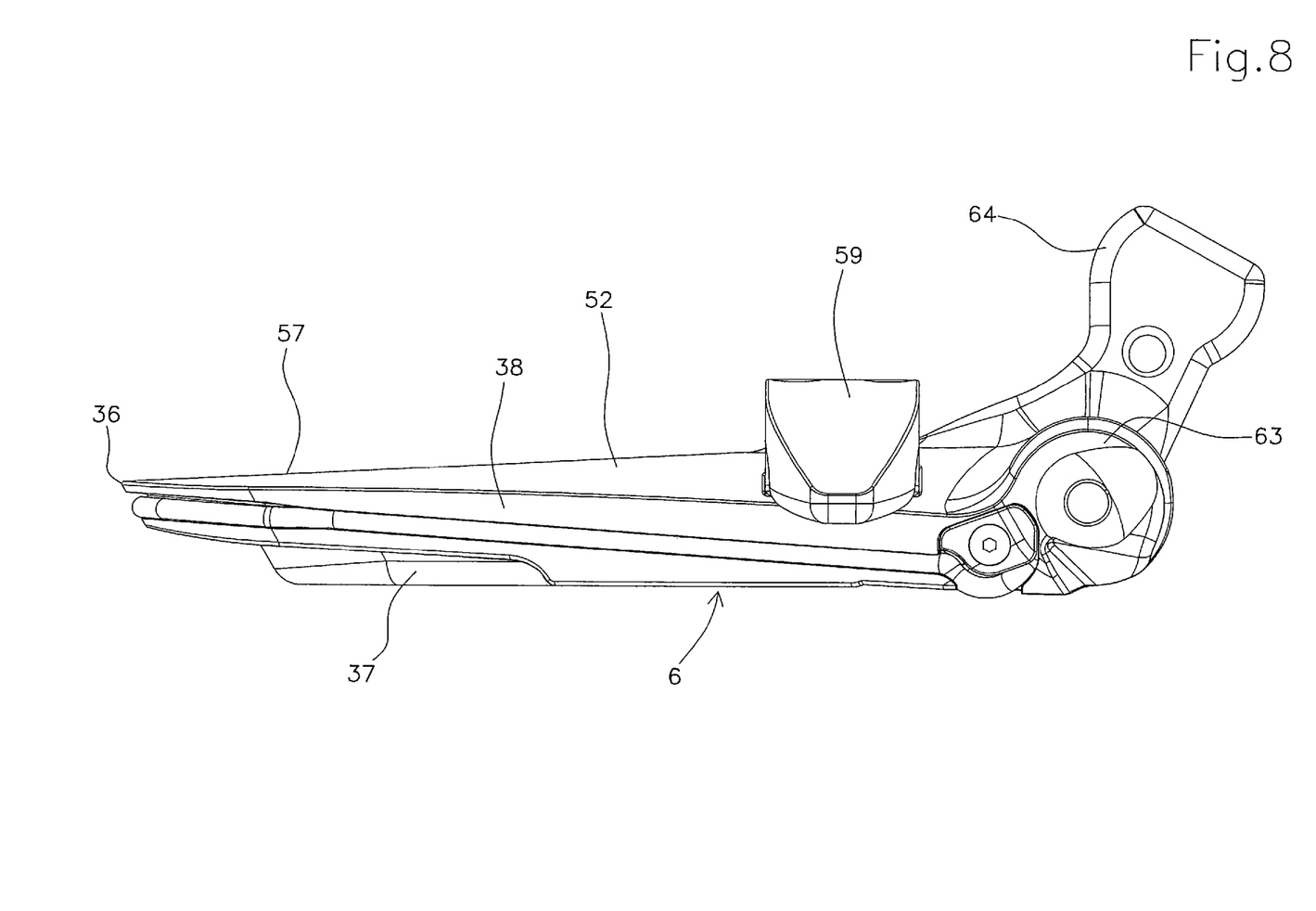
FIG. 8 shows a side view of the same petal.
Figure 9:
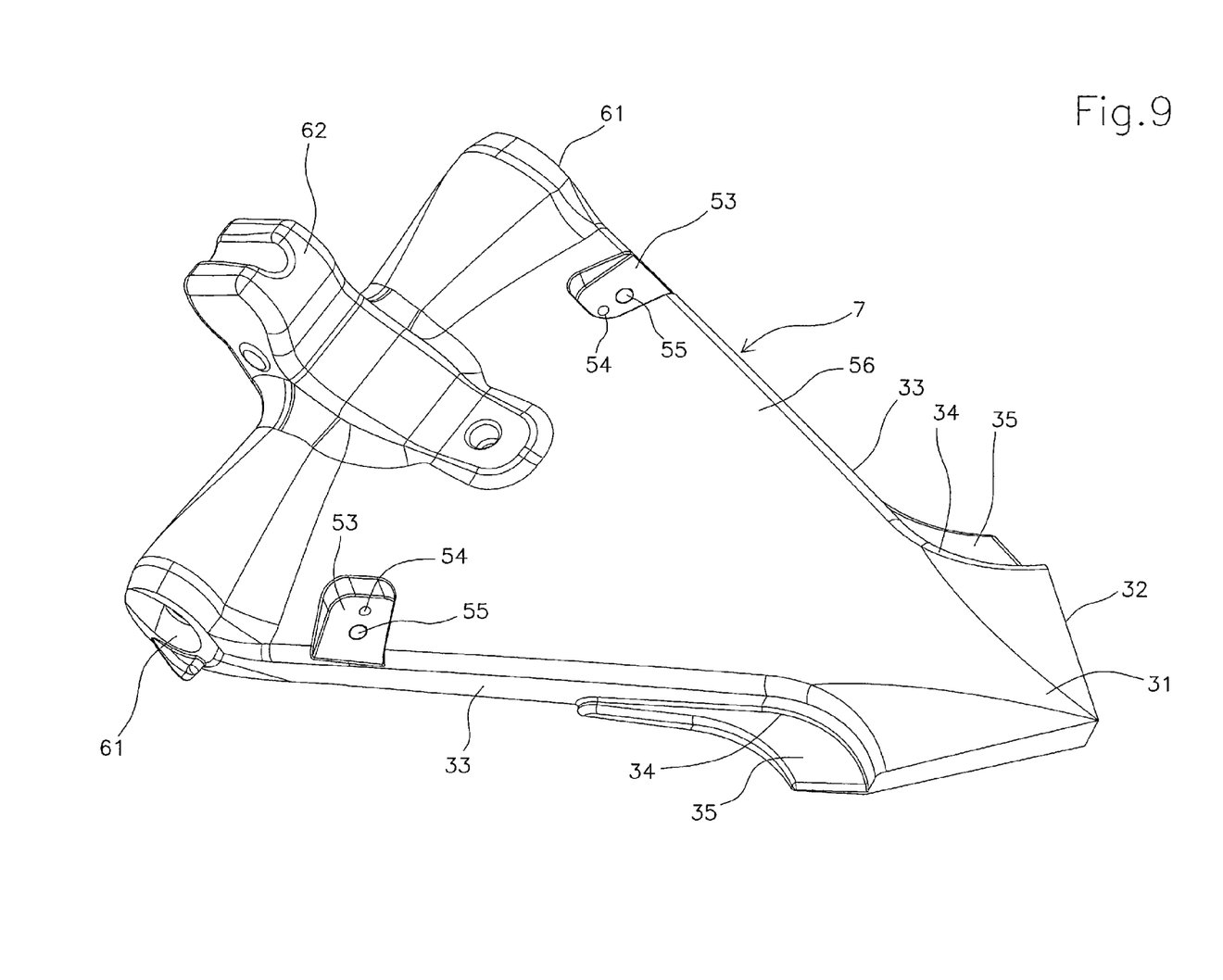
FIG. 9 shows a perspective view of one of the petals of larger size of the control valve which is upstream in the flow direction of the petroleum product.
Figure 10:
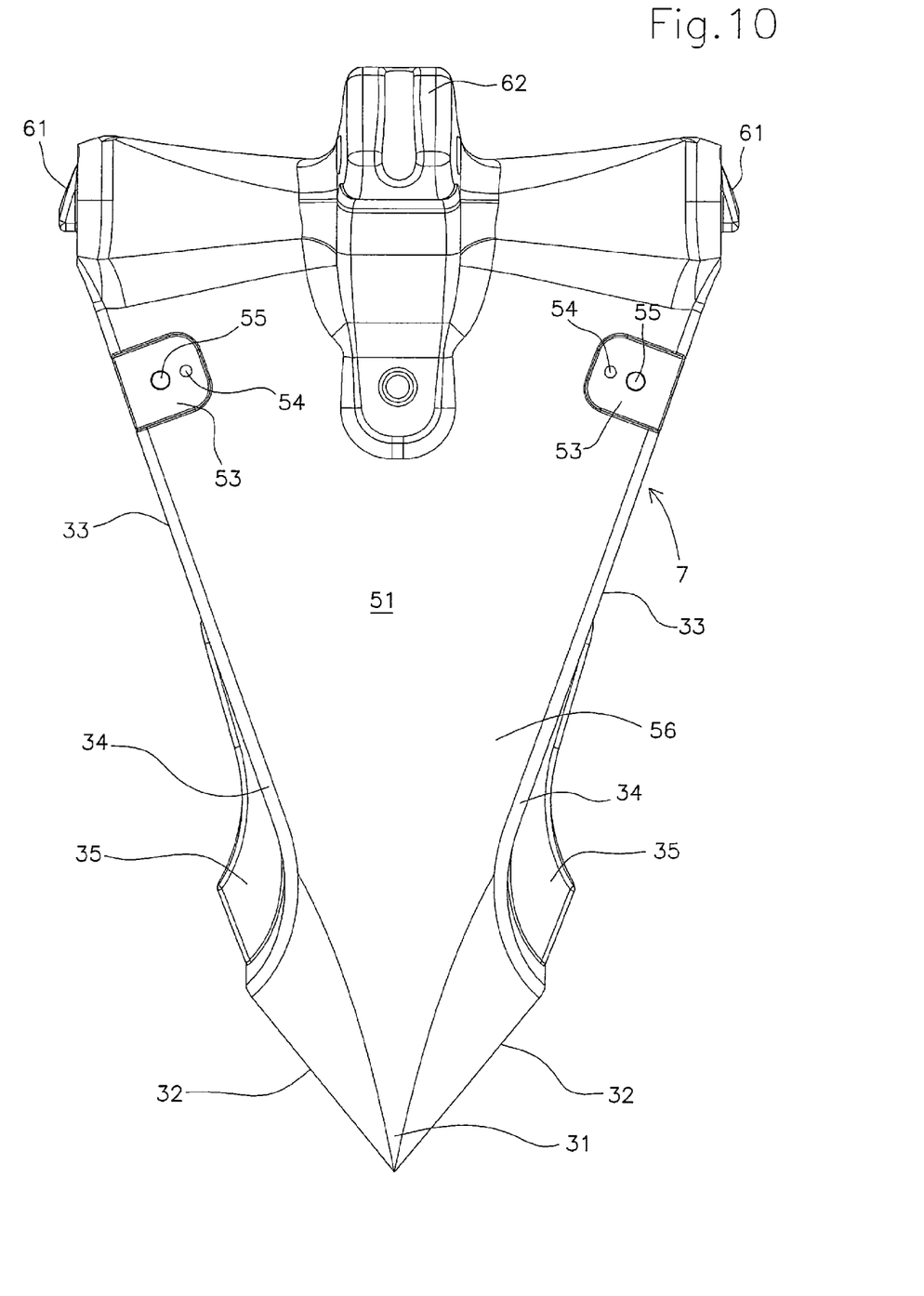
FIG. 10 shows a plan view of the same petal in FIG. 9.
Figure 11:
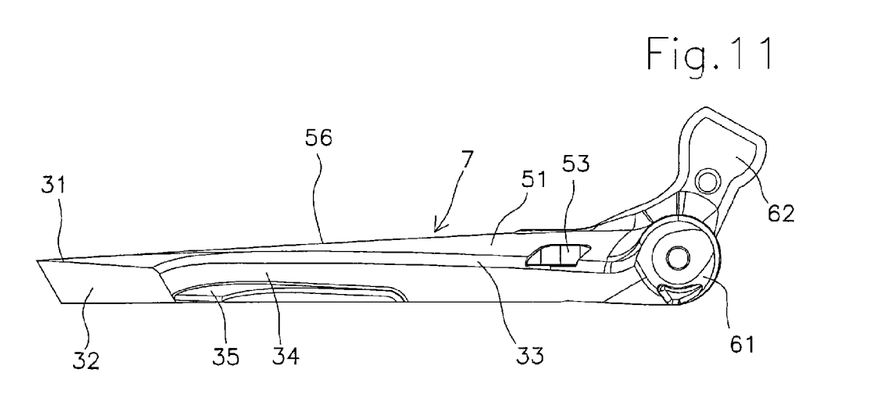
FIG. 11 shows a side view of the same petal in FIG. 9.
Figure 12:
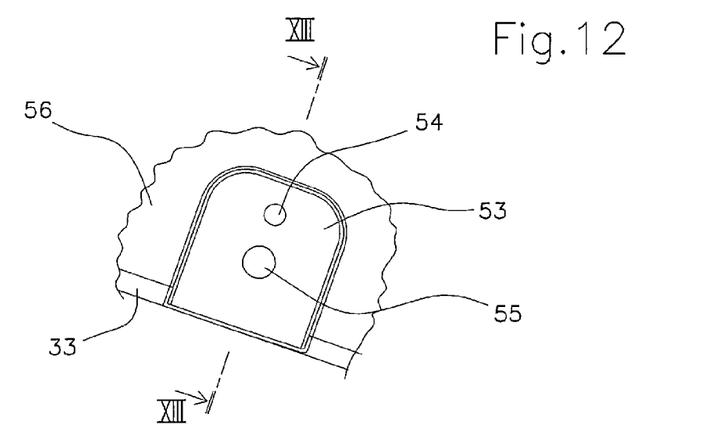
FIG. 12 shows a detail of the fixing process of one of the projections to the surface of the petal in FIGS. 9-11 on enlarged scale.
Figure 13:
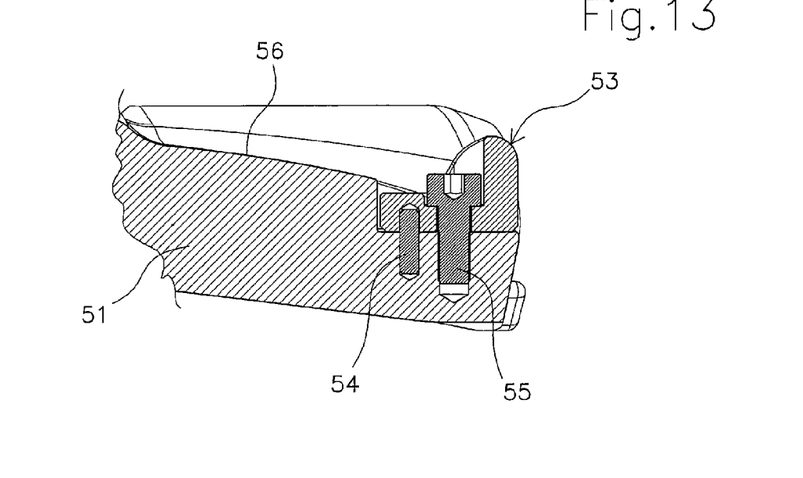
FIG. 13 shows a section view of the same detail taken along line XIII-XIII in FIG. 12.

Each valve 5-5' consists of two series of petals or segments 6-7 and 6'-7' of different shape and sizes, which alternate circumferentially and are rotatable about respective axes between the opening position in FIG. 2 and the closing position in FIGS. 3 and 4.

FIGS. 5-14 show in detail the shape and function of the petals 6 and 7 of the upstream control valve 5, made in accordance with the present invention.

A petal 7 of larger size is shown in FIGS. 9-13, where it is seen consisting of an approximately triangular body 51 which is provided with a V-shaped end 31, the sides 32 of which are intended to fluid tightly abut against the corresponding sides of the other adjacent petals 7. Petal 7 has lateral sides 33 with a curved end 34, which include a step 35 on which a side of the petal 6 of smaller size interposed between two petals 7 of larger size rests when valve 5 is closed. Two oblique projections 53 overlap and are restrained at fixing points 54 and 55 to the upstream surface 56 of the body 51 which faces the flow of petroleum product when the valve is closed. Petal 7 also includes pivoting points 61 and a control heel 62.

A petal 6 of smaller size is shown, in turn, in FIGS. 5-8, where it is seen consisting of an approximately triangular body 52 which is provided with a rounded end 36 with a step 37 (FIG. 8), which tightly engages the curved end 34 of two adjacent sectors 7 when valve 5 is closed, and with straight sides 38 which tightly engage the lateral sides 33 of the two adjacent petals 7 when valve 5 is closed. Two fins 59, which laterally protrude from the sides 38 and are provided with curved recesses 60 adapted to house, when the valve is closed, the corresponding projections 53 of the adjacent petals 7 (as shown in greater detail below), overlap and are restrained at fixing points 58 to the upstream surface 57 of the body 52, which faces the flow of petroleum product when the valve is closed. Petal 6 also includes pivoting points 63 and a control heel 64.

Figure 14:
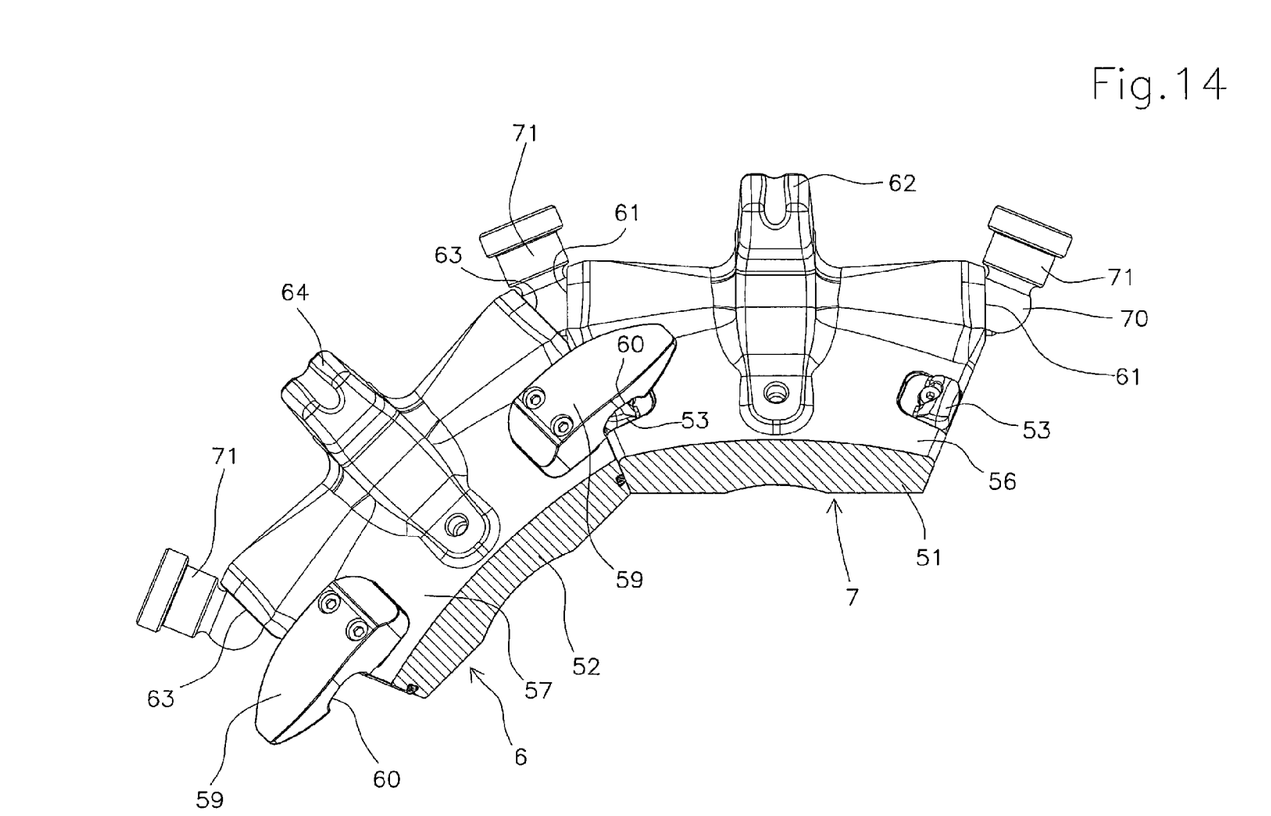
FIG. 14 shows how a petal of smaller size overlaps a petal of larger size in the closing position of the valve to which said petals belong.

FIGS. 4 and 14 show the closing configuration of the petals 7 and 6 of the control valve 5.

The movement of the single petals 7 and 6 from the opening position to the closing position is controlled by an automatic closing device 9 of the type described in Italian patent application MI2010A002248, filed on 6 Dec. 2010, which acts on the heels 62 and 64 under the bias of helical springs 17 when sleeve 4, according to the modes explained in Italian patent MI2009A002146, is axially pulled out from the interior of valve 5, thus ceasing the retaining action of the rotatable petals 6 and 7 of the valve itself.

The closing movement of petals 7 and 6 is braked by the controlled leakage of a braking fluid of the viscous type from the housing chambers 18 of the fluid itself to the housing chambers 14 of the springs 17 through leakage pipes 19 in which flow speed adjustment cartridges 21 having a helical external groove are inserted.

The leakage speed of the braking fluid is adjusted by means of differently grooved cartridges 21, so as to determine different rotation, and thus closing, speeds of the single petals of valve 5. More specifically, the closing speed of the petals 7 of larger size is set so as to be faster than that of the petals 6 of smaller size, which consequently overlap and partially rest on the edges of the adjacent petals 7, thus achieving the closing configuration in FIG. 4. This allows to obtain a closure which limits the release of product to the maximum when closing the control valve 5, thus limiting the pressure peak generated by the water hammer of the petroleum product to acceptable levels.

The fins 59 of the petals 6 of smaller size avoid any early closing of the petals 7 of larger size, and when housing the projections 53 of petals 7 in their recesses 60, allow an accurate placement of the petals in the tight closing position, as shown in FIG. 14.

The petals 6'-7' of the downstream control valve 5' in the flow direction of the fluid product are similarly provided with fins and projections similar to the fins 59 and the projections 53 of petals 6-7, and are in turn provided with automatic closing devices, described in patent application MI2010A002248, which by means of appropriate springs act on the heels of petals 6' and 7' to determine the rotation and thus the automatic closing of petals 6' and 7' when sleeve 4 is pulled out (FIG. 3). The braking effect is here determined by the pressurized fluid inside the joining part 2.

For units having a one-direction flow, the downstream valve may thus not be provided with a braking system but only with the automatic closing device biased by a spring.

The invention claimed is:

1. A control valve for a connection unit for flexible hoses, comprising a plurality of petals (segments or sectors) rotatable between a position of complete opening and a position of complete closing, wherein said plurality of rotatable petals consist of pairs of petals with different shape and size alternately arranged along the circumference of the connection unit and wherein the petals of smaller size are controlled so as to close more slowly than those of a larger size so as to reach a contact position of respective lateral edges, wherein an upstream surface of the petals of smaller size is provided with a pair of fins laterally protruding from the upstream surface so as to rest on an upstream surface of the petals of larger size to oblige the latter to close before the petals of smaller size, and in that the upstream surface of the petals of larger size is provided with a pair of projections which at the end of the closing movement of the petals are inserted in corresponding recesses of a facing surface of the fins for making a precise and stable coupling of the adjacent petals in a tightly closed position.

2. The control valve according to claim 1, wherein the petals of larger size have a V-shaped end, the sides of which are intended to fluid-tightly abut against the corresponding sides of other adjacent petals of larger size, and also have lateral sides with a curved end, which includes a step on which a side of a petal of smaller size interposed between two petals of larger size rests when the valve is closed, and said petals of smaller size have a rounded end with a step which tightly engages the curved ends of two adjacent petals when the valve is closed, and straight sides on which the step continues, which tightly engage the lateral sides of the two adjacent petals when the valve is closed.

* * * * *